Figure 1:
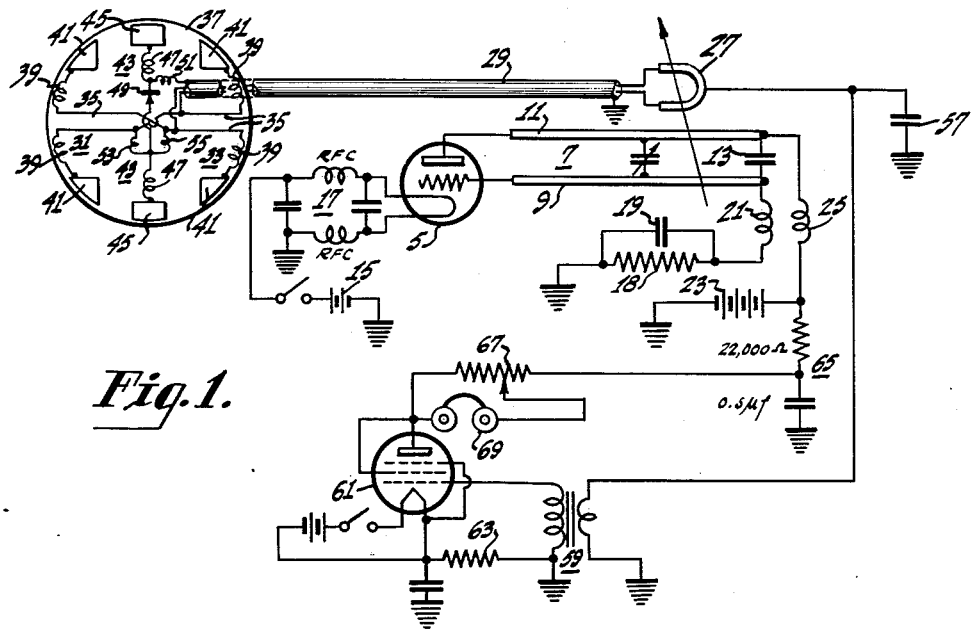

Sept. 12, 1961  H. J. WOLL  2,999,979
APPARATUS FOR SUBSURFACE INVESTIGATING
Filed Nov. 15, 1946  2 Sheets-Sheet 1

Inventor
Harry J. Woll
By
Attorney

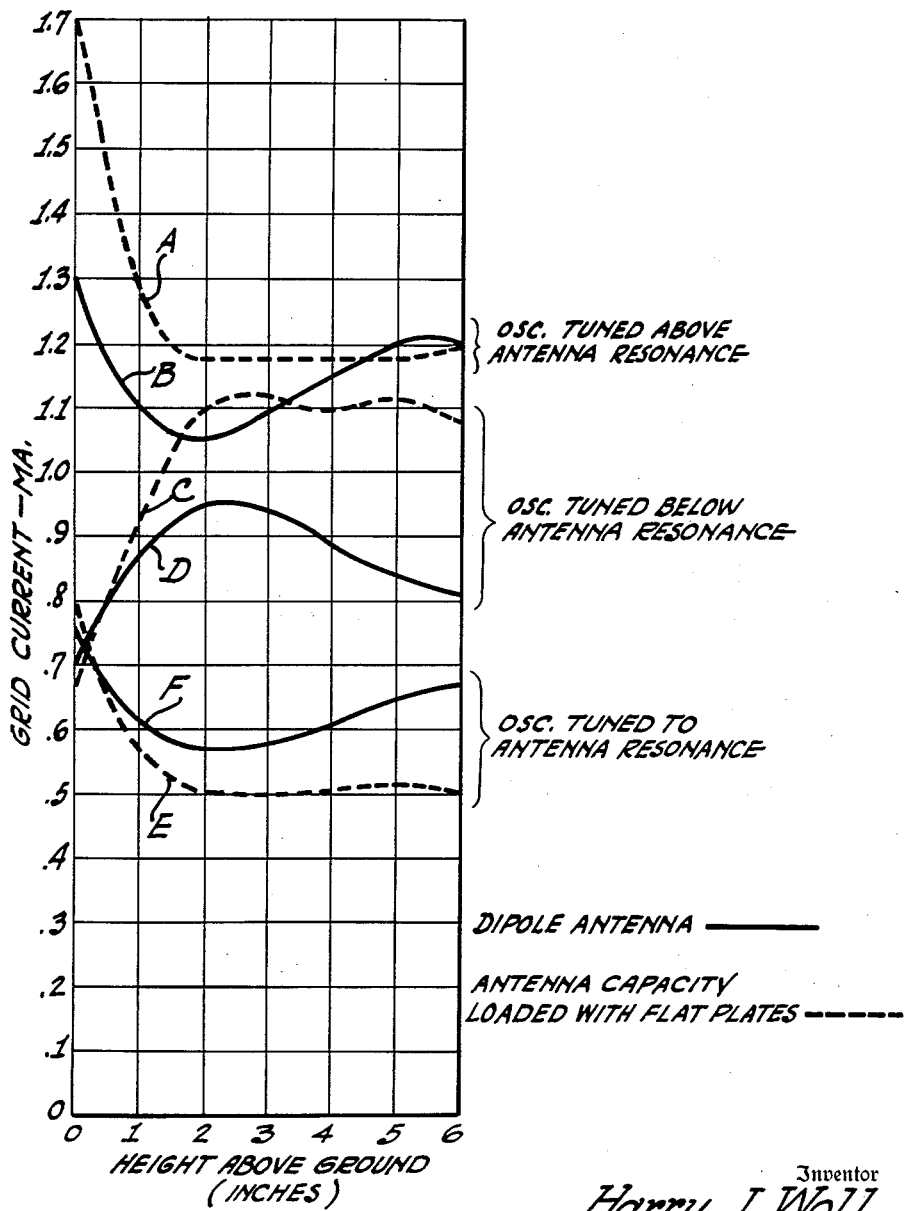

United States Patent Office
2,999,979
Patented Sept. 12, 1961

2,999,979
APPARATUS FOR SUBSURFACE INVESTIGATING
Harry J. Woll, Haddon Heights, N.J., assignor, by mesne assignments, to the United States of America as represented by the Secretary of the Army
Filed Nov. 15, 1946, Ser. No. 709,897
9 Claims. (Cl. 324—3)

This invention relates to the art of detecting discontinuities beneath the surface of the earth, and in particular to the detection or location of non-metallic objects or materials such as explosive mines buried in the earth.

In a copending application, Serial No. 542,870, filed June 30, 1944, and now abandoned, John B. Gehman describes and claims a non-magnetic mine detector which utilizes the variation in radiation impedance of a portable antenna to produce a variation in the amplitude of oscillation of a high frequency oscillator to which it is coupled. When the antenna is moved parallel and in close proximity to the ground, the output signal indicates changes in the nature of the ground, such as might be due to the presence of a non-magnetic mine.

It will be appreciated that devices of this type must be sensitive to changes in the nature of the subsurface strata without being sensitive to the ground effect due to changes in the position of the device with respect to the surface, at least within reasonable tolerances. It is usual to carry the pickup coil or antenna, as the case may be, on the end of a pole which an operator moves back and forth while searching for buried mines. The device cannot be held accurately at a fixed distance from the ground, and it is therefore the primary object of this invention to provide a detector of this type which is insensitive to changes in its position with respect to the ground.

In accordance with the copending application of Gehman, referred to above, a certain degree of compensation is obtained by adjusting the natural period of the dipole antenna to a frequency lower than the oscillator frequency. The detuning effect of the ground tends to compensate for changes in the antenna load impedance, with the result that changes in the output are neutralized while the sensitivity of the device to dissymmetries in the effective field is not reduced. It is a further purpose of this invention to provide an improved antenna design for subsurface investigating equipment which allows greater freedom of movement than has heretofore been possible without producing spurious indications due to the ground effect.

A further advantage of the present invention is that for a given frequency a smaller antenna can be employed, or for an antenna of the same size a lower operating frequency may be employed. The prior arrangement employed a dipole antenna having an overall length of $\lambda/2$, and a reflector slightly longer than $\lambda/2$. The actual length of such an antenna is, of course, a function of frequency. In order to keep the physical dimensions of such an antenna and reflector within reasonable limits, it is necessary to use an extremely high frequency. Fortunately a relatively high frequency is usually preferred for this purpose, but by extending downward the frequency limitation imposed by physical dimensions, greater flexibility is provided which permits the selection of that frequency which is best suited for the detection of objects of certain sizes. It is thus possible more effectively to discriminate between a large mine, for example, and a small stone or other similar discontinuity of the soil.

In brief, the above objects are achieved by utilizing an antenna of unique design containing lumped inductance and capacity. An alternative construction having further advantages utilizes a balanced system employing two transmitting antennas so phased that a null point exists between them, and a receiving antenna so placed in the null point, that it is effectively normally decoupled from the transmitting antenna.

Figure 2:
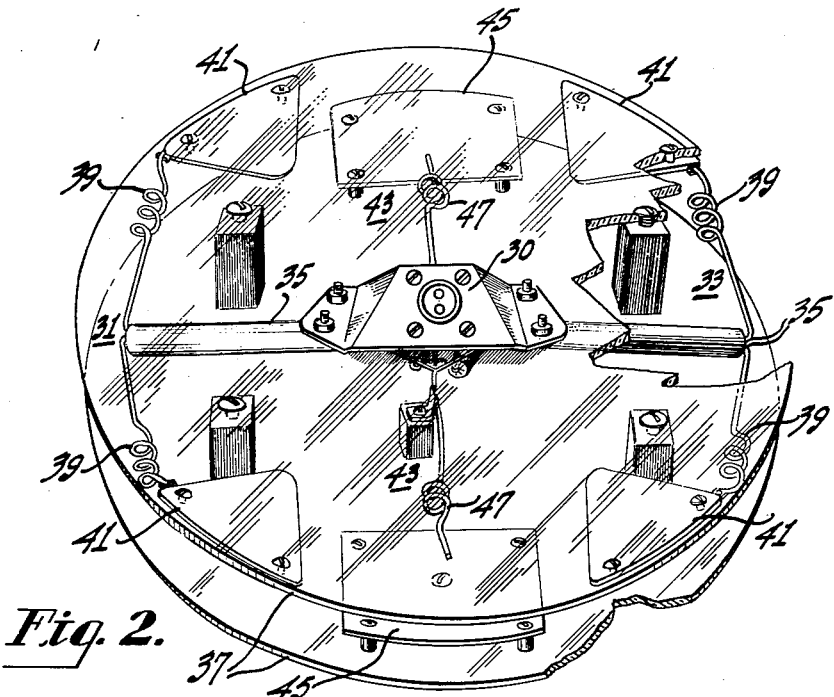

The novel features that are considered characteristic of this invention are set forth with particularity in the appended claims. The invention both as to its organization and method of operation, as well as additional objects and advantages thereof, will best be understood from the following description when read in connection with the accompanying drawings, in which FIGURE 1 is a circuit diagram of a detection device;
FIGURE 2 is a perspective view of an antenna for a detection device, and
FIGURE 3 is a series of curves illustrating the operation of this invention.

Referring to FIG. 1, a miniature triode 5 is connected in a conventional ultra-high frequency oscillator circuit which includes a folded half-wave oscillatory tank circuit 7 of two parallel conductors 9 and 11 which are short-circuited for R.F. at one end by a capacitor 13 and connected at the free end to the grid and plate electrodes of tube 5. Filament current is obtained from a battery 15 through a low-pass filter 17. A blocking grid leak 18 and condenser 19 are connected from ground through a radio frequency choke 21 to a point of voltage node on conductor 9. The grid leak 18 and the condenser 19 provide a resistance-capacitance combination such that the oscillator is periodically blocked at an audio rate to produce a modulated output. Plate supply is provided by a battery 23 connected between ground and a point of voltage node on conductor 11, through a R.F. choke 25.

The tank circuit 7 constitutes the primary of the output transformer, the secondary of which is a U shaped conductor 27 movably positioned near the low potential end of the oscillator tank and coupled thereto. The high potential ends of the secondary 27, or such points along the length of the secondary that produce a suitable impedance match, are connected to a shielded two-wire transmission line 29, the shield of which is grounded.

In practice the oscillator, as well as the receiver, are carried by the operator in a suitable container equipped with a shoulder strap. The transmission line 29 then extends inside the handle of the probe to the antenna mounted on its end and positioned so as to be held conveniently a few inches above and parallel to the ground. The antenna itself is preferably enclosed within a suitable casing of insulating material to protect it from damage. The casing and the physical arrangement have not been shown since they are conventional and may be designed to meet the requirements.

It will be appreciated that the antenna structure must be light, rugged and small. The weight is important since the antenna must be held in front of the operator on the end of a two to four foot handle, and moved back and forth so as to cover the area being investigated. The antenna must also be held above the surface of the ground, but this distance is not critical between, say, two to six inches in the device herein claimed. Realizing also that the search must frequently be made under fire when the user must be prone, and preferably that it should permit one hand to be free to carry a rifle or other defensive equipment, the great importance of light weight and small size will be appreciated.

Referring now to FIGS. 1 and 2, the antenna is enclosed within a light plastic casing, cylindrical in shape, approximately 12 inches in diameter and 1½ inches thick, assuming an operating frequency of the order of 300 mc. The housing is preferably made larger than the antennae so that the conductors are at least ½ inch from the edge. This helps reduce the effect of grass and weeds. The transmitting antenna consists of a pair of loaded dipoles 31 and 33. The antennae have both inductive and capacitive loading to reduce their size. The two dipoles are fed by a crossed-over transmission line 35, which is located along a diameter of one of the supporting discs 37 which may be of Lucite or similar light insulating material. The transmission line terminates at diametrically opposed points on the circumference of the disc and there connects to the two legs of the dipole antennae. Each leg consists of a small self-supporting coil 39 and terminates in a capacity plate 41. Preferably the dipole legs follow the arc of the circumference of the supporting disc, the capacity end loading plates being shaped so as to conform to the shape of the disc, as shown. The two leads from the transmission line 29 are connected to the line 35 at the cross-over point. In FIG. 2, a plug connector 30 is shown to which the transmission line 29 is to be connected.

The phasing of the transmitting dipoles is such that a neutral field exists midway between them. The loaded receiving dipole 43 is located in this neutral field and lies midway between the transmitting dipole arms and on the diameter which is perpendicular to transmission line 35. The receiving dipole 43 is capacity loaded at its extremities by plates 45 and each leg includes a small coil 47 for inductive loading. The two legs terminate at a small crystal rectifier 49 which acts as the receiver detector. While separate leads could be run from the detector to the receiver amplifier, it is preferable to superimpose the rectified signal on the radio frequency transmission line 29. This may be accomplished by connecting one side of the rectifier to the grounded sheath, through a radio frequency choke 51, and the other side of the rectifier in parallel to both inner conductors through two radio frequency chokes 53 and 55. Both sides of the line are utilized in order to maintain a balanced impedance across the line. The rectified voltage is taken from the center or voltage node point of secondary 27. Unwanted radio frequency currents are by-passed by a capacitor 57. The rectified current is then applied to the primary of a coupling transformer 59, the secondary of which is connected to the grid of an amplifier 61. Grid bias is provided by resistor 63 in the cathode circuit. Plate voltage is derived from battery 23 through a resistance-capacitance filter 65. Output is taken from the plate load resistor 67 by headphones 69 or an equivalent output device such as a meter or the like.

When the oscillator is operating and the antenna head is held parallel to and from two to six inches above the surface of homogeneous earth, the two out-of-phase radiated signals are balanced, and the receiving antenna being located in radiation fields of equal intensity and opposite phase, no signal is heard in the phones. However, an underground mine or similar discontinuity will unbalance the field and a tone will be heard. As the antenna passes over the object, the tone will increase in intensity, drop by zero directly over it, increase again and then die away.

In addition to decreasing the physical size required to resonate the antenna at the operating frequency, the end plates are responsible for good height compensation, so that the device is freed from the great disadvantage of earlier known systems in which small changes in the distance between the antenna and ground produced relatively large variations in the output signal. Further, such an antenna has been found to be much less critical to the oscillator frequency, the coupling, and the Q of the resonant system.

The improved height compensation results from the use of a balanced system. However, it is also necessary to consider the effect of tilting the antenna from a plane parallel to the ground. Normally, tilting would be expected to cause an unbalance and to produce a spurious signal. It has been found that the sensitivity of the device to tilting is greatly diminished by the end loading of the antenna. In addition the tilting sensitivity is further diminished by locating the loading plates 41 of the transmitter dipoles about ¾" higher than the loading plates 45 of the receiving dipole and by extending the transmitter plates inwardly toward the loading plates of the receiving dipole, as shown in FIG. 2.

FIG. 3 shows the comparative height compensation of the improved arrangement compared to the performance of an unloaded dipole antenna system. Curve A shows the variaiton of output in terms of grid current, as the height of the antenna of this invention is varied from 0 to 6 inches above ground, the oscillator being tuned to a frequency above antenna resonance. Curve B shows the variation of an unloaded dipole system under the same conditions. The substantially flat output of the improved arrangement between two and six inches is evident.

Curves C and D are for the present arrangement and the previously known system, respectively, when the oscillator frequency is below antenna resonance. Here again the improvement is evident.

Curves E and F are similar curves when the oscillator is tuned to the resonant frequency of the antenna, in each case. Once again the present arrangement (curve E) shows substantially flat output between two and six inches.

There has thus been described a mine detector having improved height and tilt compensation, and which is further characterized by light weight and small size.

What I claim is:

1. In a device of the character described, an oscillator, a pair of spaced dipole transmitting antennae each having two opposed legs disposed about the circumference of a circle, a crossed over two wire transmission line connected to said antennae, each wire of said transmission line being connected to one leg of each dipole antenna, means including said transmission line for energizing said transmitting antennae in phase opposition from said oscillator, and a dipole receiving antenna interposed between and equally capacitively coupled to said transmitting antennae in the radiation field thereof so as to be normally non-responsive to signals therefrom, said antennae being inductively and capacitively loaded, and indicator means coupled to said transmission line and responsive to currents induced in said receiving antenna due to a distortion of the radiation field coupling said antennae.

2. A device of the character described in claim 1 in which said transmitting antennae lie in a plane displaced from the plane containing the receiving antenna.

3. A device of the character described in claim 1 in which the outer ends of said transmitting antennae terminate in capacity loading plates and each leg of each dipole includes a lumped inductance.

4. A detector for foreign objects located under the surface of the earth comprising an oscillator, a pair of spaced dipole transmitting antennae energized in phase opposition by said oscillator, each antenna having two opposed legs disposed about the periphery of a circle, and a receiving dipole antenna located between said transmitting dipoles along the periphery of said circle and lying in normally neutral portions of the radiated field but responsive to an unbalance in at least one of said field due to the presence of said objects in said field, said transmitting dipole antennae extending inwardly toward said receiving dipole and terminating in capacity loading plates.

5. A device of the character described in claim 4 in which said receiving dipole terminates in capacity loading plates which are positioned so as to be nearer the surface of the earth than the loading plates of said transmitting dipoles.

6. A detector for foreign objects located under the surface of the earth comprising a modulated oscillator, a pair of spaced dipole transmitting antennae lying in a plane and adapted to be held in an operating position substantially parallel to the surface of said earth, means including said oscillator for energizing said antennae in phase opposition, a receiving dipole located in a normally neutral field between said transmitting dipoles, and a rectifier connected between the legs of said receiving dipole for producing rectified output currents indicative of a condition of unbalance in the radiation fields of said transmitting dipoles, said dipoles each including lumped inductance and capacitive loading plates, the legs of said transmitting dipoles extending inwardly toward said receiving dipole and lying substantially on equally spaced arcs of a circle.

7. A device of the character described in claim 6 in which the capacitive loading plates of said receiving dipoles are positioned so as to be nearer the earth's surface than the loading plates of said transmitting dipoles.

8. A detector for foreign objects located under the surface of the earth comprising in combination, a high frequency oscillator, a pair of spaced dipole transmitting antennas, each having two opposed legs disposed about the circumference of a circle, each leg comprising a self-supporting inductance coil and a terminating capacity plate, said inductance coils and capacity plates conforming with and lying substantially in the circumference of said circle, a crossed-over two-wire transmission line extending along a diameter of said circle, means including said transmission line for energizing said transmitting antennas in phase opposition from said oscillator, and a dipole receiving antenna interposed between and equally capacitively coupled to said transmitting antennas in the radiation field thereof so as to be normally non-responsive to signals therefrom, said receiving antenna including in each leg thereof an inductance element and a terminating capacitor plate.

9. A detector for foreign objects located under the surface of the earth comprising in combination, a high frequency oscillator, a pair of spaced dipole transmitting antennas, each having two opposed legs disposed about the circumference of a circle, each leg comprising a self-supporting inductance coil and a terminating capacity plate, said inductance coils and capacity plates conforming with and lying substantially in the circumference of said circle, a crossed-over two-wire transmission line extending along a diameter of said circle, and connected to said antennas, each wire of said transmission line being connected to one leg of each of said dipole antennas, means including said transmission line for energizing said transmitting antennas in phase opposition from said oscillator, a dipole receiving antenna interposed between and equally capacitively coupled to said transmitting antennas in the radiation field thereof so as to be normally non-responsive to signals therefrom, said receiving antenna being inductively and capacitively loaded in a similar manner to said transmitting antennas and including in each leg thereof an inductance element and a terminating capacitor plate, and a receiver including audio frequency detector means coupled to said transmission line and responsive to currents induced in said receiving antenna due to a distortion of the radiation field coupling said antennas.

References Cited in the file of this patent

UNITED STATES PATENTS

| | | |
|---|---|---|
| 1,838,371 | Deardorff | Dec. 29, 1931 |
| 2,110,159 | Landon | Mar. 8, 1938 |
| 2,187,618 | Gerhard | Jan. 16, 1940 |
| 2,220,070 | Aiken | Nov. 5, 1940 |
| 2,243,182 | Amy et al. | May 27, 1941 |
| 2,324,462 | Leeds et al. | July 13, 1943 |
| 2,419,567 | Labin | Apr. 29, 1947 |

FOREIGN PATENTS

| | | |
|---|---|---|
| 20,656 | Australia | June 14, 1929 |